US008441373B2

(12) United States Patent
Jonsson et al.

(10) Patent No.: US 8,441,373 B2
(45) Date of Patent: May 14, 2013

(54) UTILITY USAGE MEASUREMENT

(75) Inventors: Karl Jonsson, Rancho Santa Margarita, CA (US); Christian Vandendorpe, Amsterdam (NL)

(73) Assignee: Greenwave Reality PTE Ltd., Singapore (SG)

( * ) Notice: Subject to any disclaimer, the term of this patent is extended or adjusted under 35 U.S.C. 154(b) by 0 days.

(21) Appl. No.: 13/539,403

(22) Filed: Jun. 30, 2012

(65) Prior Publication Data

US 2012/0280832 A1 Nov. 8, 2012

Related U.S. Application Data

(63) Continuation of application No. PCT/US2011/035449, filed on May 6, 2011.

(51) Int. Cl.
*G08C 19/06* (2006.01)

(52) U.S. Cl.
USPC .......... 340/870.05; 340/870.02; 324/76.11; 702/189; 702/127; 702/57; 705/412

(58) Field of Classification Search .......... 340/870.02–870.03, 870.04–870.05; 324/601, 76.11, 76.39, 103 R, 130; 702/189, 702/127, 57–62; 705/412
See application file for complete search history.

(56) References Cited

U.S. PATENT DOCUMENTS

| 2003/0004661 A1 | 1/2003 | Burns et al. |
| 2004/0078154 A1 | 4/2004 | Hunter |
| 2008/0068004 A1 | 3/2008 | Briese et al. |

FOREIGN PATENT DOCUMENTS

| WO | 8203482 A1 | 10/1982 |
| WO | 2007134397 A1 | 11/2007 |

OTHER PUBLICATIONS

Hwan, Oh Keyung, International Search Report for PCT/US2011/035449, Feb. 9, 2012, Korean Intellectual Property Office.
Hwan, Oh Keyung, Written Opinion of the International Searching Authority for PCT/US2011/035449, Feb. 9, 2012, Korean Intellectual Property Office.
Notice of Allowance for U.S. Appl. No. 13/539,405, United States Patent and Trademark Office, Feb. 6, 2013.

*Primary Examiner* — Albert Wong
(74) *Attorney, Agent, or Firm* — Bruce A. Young

(57) ABSTRACT

Pulses, including electrical waveforms, emitted light, and light reflected by a moving mechanical device, that are emitted by a standard utility meter may be received. A device may be controlled to vary its usage of the utility and that may be used to determine a usage per pulse. The usage per pulse information may be used to convert a pulse rate from a meter to emulate the pulse rate from another meter. Information about the other meter and/or services offered by the other meter may be provided to allow for emulation of the other meter.

35 Claims, 10 Drawing Sheets

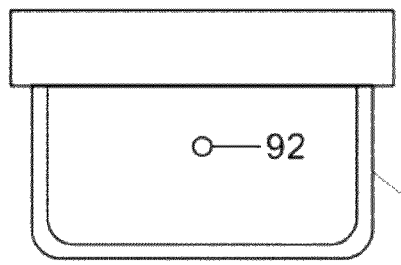
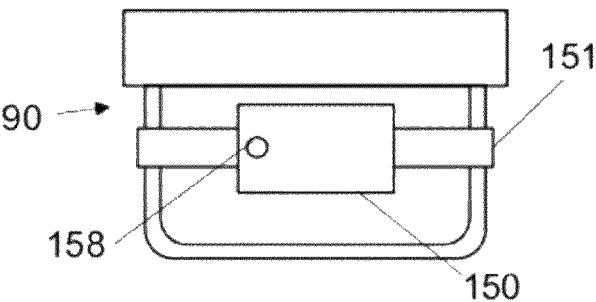
FIG. 2B                FIG. 2D
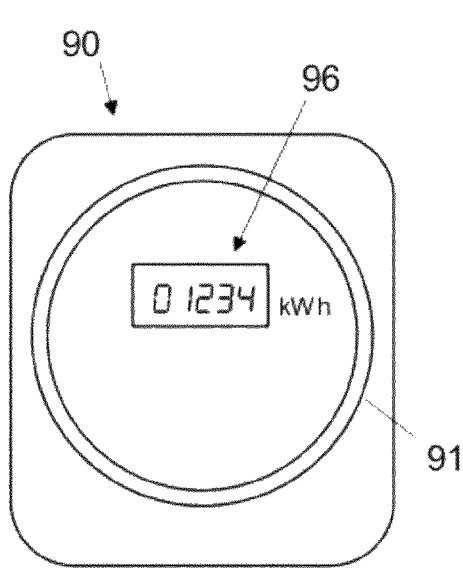
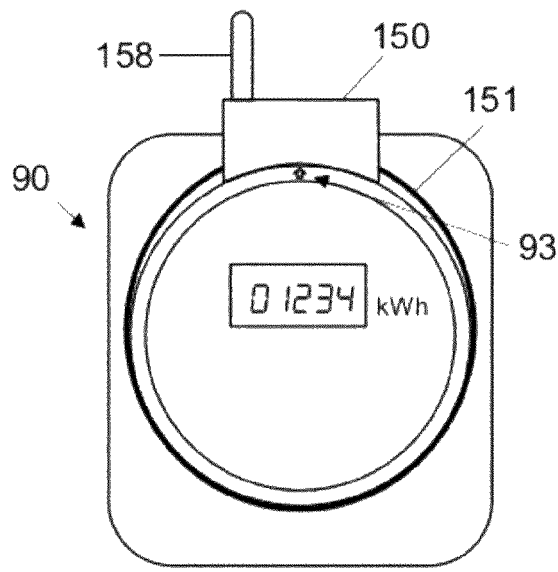
FIG. 2C                FIG. 2E

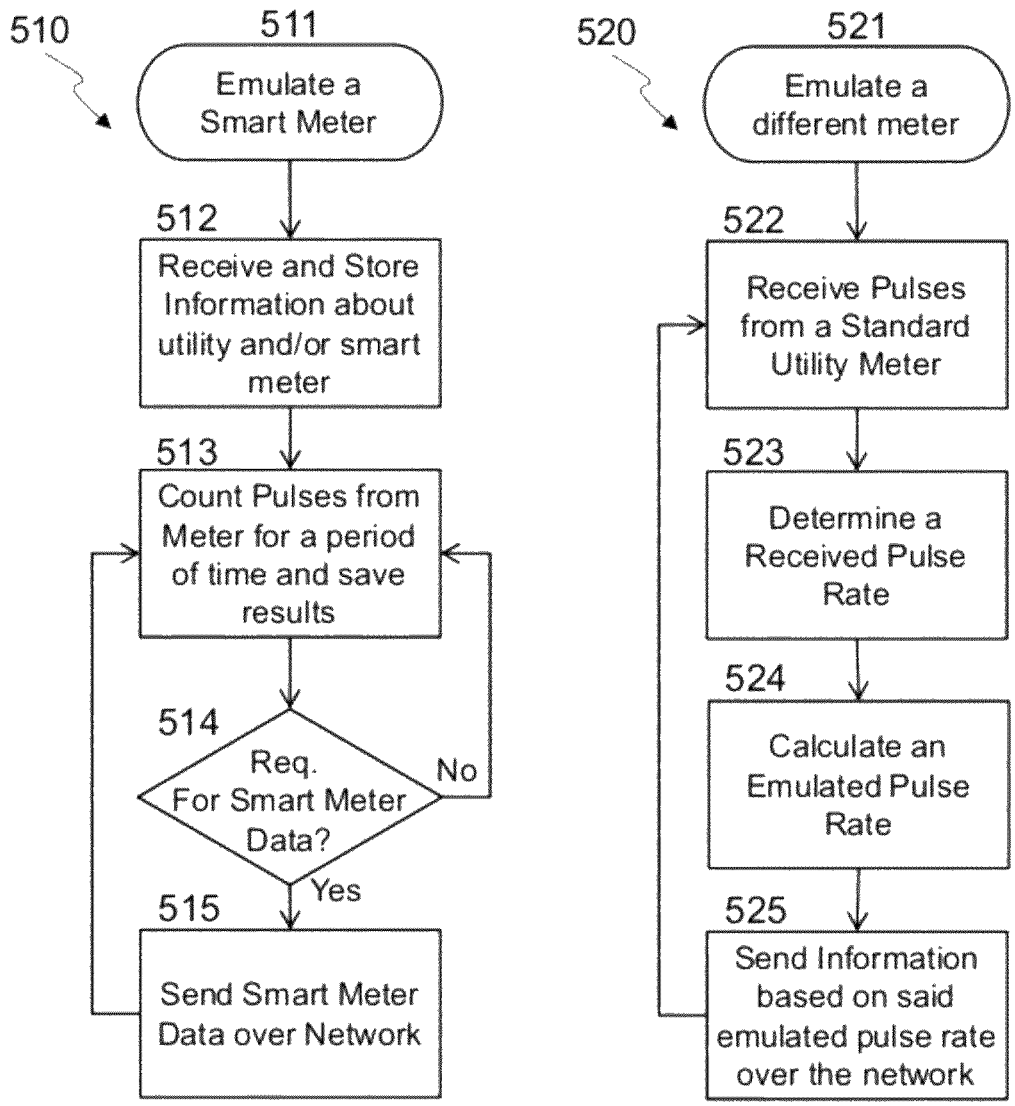

UTILITY USAGE MEASUREMENT

BACKGROUND

1. Technical Field

The present subject matter relates to metering of utility usage. In particular, it relates to emulation of a smart utility meter.

2. Description of Related Art

Various utility services, such as electrical power, natural gas, and water, are commonly delivered to homes and businesses as a commodity and then billed to the consumer of the utility based on their usage of the utility. The usage of the utility is typically measured by a utility meter that is commonly on the premises of the consumer and monitors the transfer of the commodity from the utility provider to the consumer in real time.

Standard meters that are commonly used may measure the transfer of the commodity using methods that are applicable to the particular utility. So, for example, an electrical meter may measure the magnetic flux of the current flowing through a conductor, the voltage across the mains, the voltage drop across a low resistance in series with the load, or any combination of those, or other, methods. A gas or water meter may use a mechanical flow meter or use a pitot tube to measure the flow velocity. Standard meters historically have included a display of some sort that was readable by a human being. A "meter reader" would then make periodic visits to the meter to determine the current meter value which could then be used to bill the consumer. In the last decade or two, it has become common for a standard meter to provide some kind of signal that could be machine readable at a short distance so that a meter reader would only need to get within a certain distance to read the meter value. These meters could be read by simply driving down the street or pulling in the driveway and use a variety of technologies such as radio frequency (RF) identification (ID) tag technology and short range RF communication protocols. But standard utility meters may not provide more advanced usage-related data such as costs and usage profiles over time.

Utility meters have emerged in recent years that may provide more advanced usage data and may have more advanced communication capabilities. Such meters may connect to a wide area network (WAN) to communicate directly to the utility provider's network, or a third party WAN, such as a third generation (3G) cellular data network, to provide connectivity to the utility provider. In some cases, the advanced utility meters may connect to a home area network (HAN) or local area network (LAN) and may allow a consumer to access the advanced usage data from the utility meter. In some cases, the advanced utility meter may still connect to the utility provider through a provider network or public WAN, in addition to its connection to the HAN/LAN. Advanced utility meters are being deployed by some utility providers in some geographic areas but much of the existing infrastructure is still using standard meters.

SUMMARY

Various embodiments of methods, computer program products, apparatus and systems for measuring utility usage may receive pulses from a utility meter that are emitted dependent on usage of a utility measured by the utility meter. A first number of pulses emitted during a first period of time may be counted and a first usage of the utility by a device during the first period of time may be determined. A second number of pulses emitted during a second period of time may be counted and a second usage of the utility by a device during the second period of time may be determined. Then a usage per pulse based on a difference in the first usage and the second usage, and a difference in the first number of the pulses and the second number of the pulses may be calculated.

Other embodiments of methods, computer program products, and apparatus for measuring utility usage may receive pulses from a standard utility meter at a received pulse rate that are emitted dependent on a measured usage per pulse by the standard utility meter. Information may be sent at an emulated pulse rate over a network based on the received pulse rate, the measured usage per pulse, and an emulated usage per pulse.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIGS. 2B and 2C show a top view and front view of another type of standard utility meter;

FIGS. 2D and 2E show a top view and front view of an alternative embodiment of a pulse receiver attached to the other type of standard utility meter;

FIGS. 5B and 5C are flowcharts depicting embodiments of methods of emulating a smart utility meter.

DETAILED DESCRIPTION

Figure 1A:
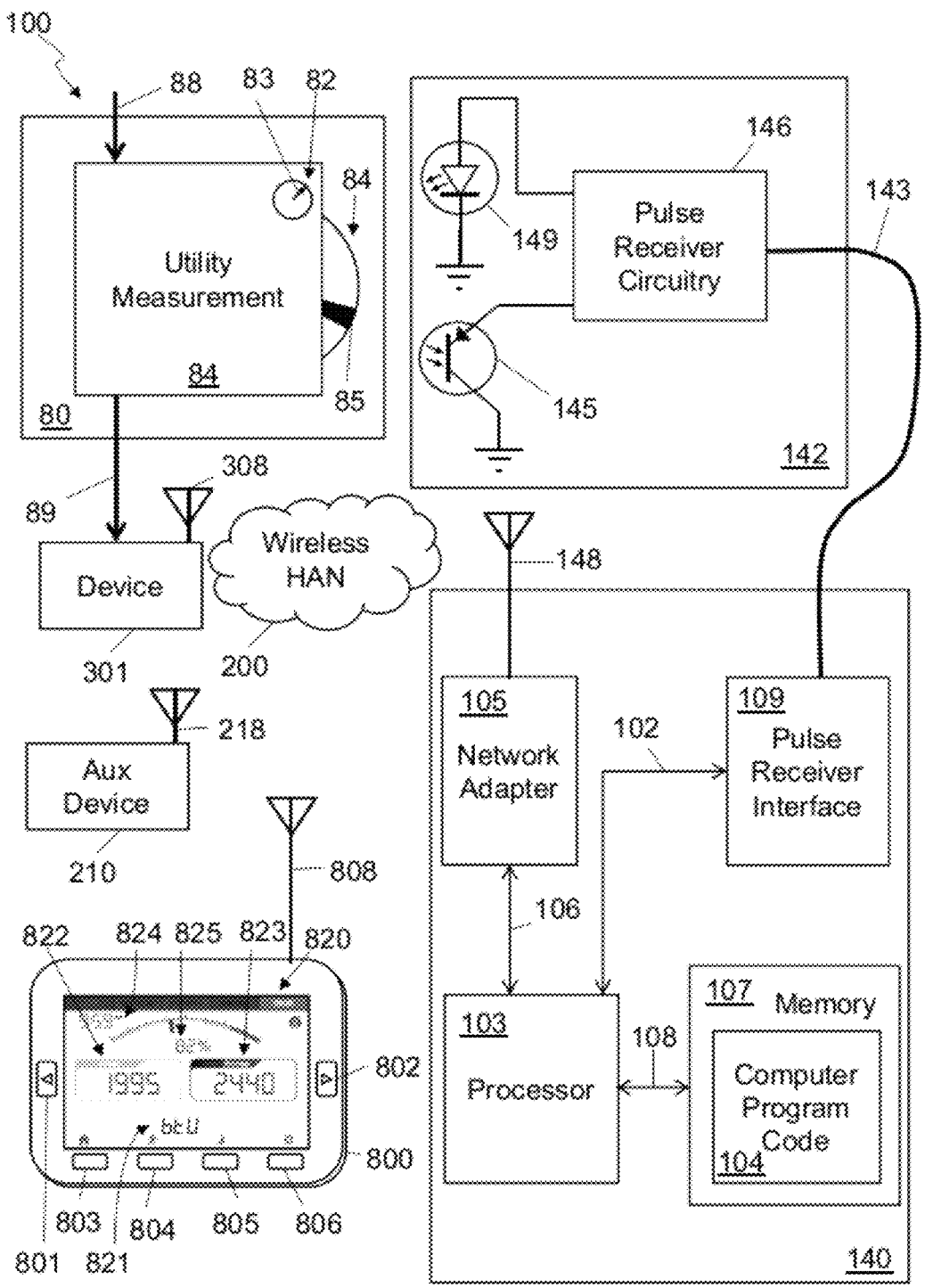
FIG. 1A is a block diagram of an embodiment of a system for measuring a utility usage.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A "Home Area Network (HAN)" is a network within a single family's dwelling, such as a single family home or an apartment. The HAN may be homogeneous, using only one type of networking, or heterogeneous, using two or more types of networking, including, but not limited to: wired, such as Ethernet or other Institute of Electrical and Electronics Engineers (IEEE) 802 wired standards; wireless, such as Z-Wave®; IEEE 802.11a/b/g/n or other IEEE 802 wireless standards such as 802.15.4 Zigbee®, or power line communications, such as HomePlug® or INSTEON® networks. In many contexts, a local area network (LAN) may be synonymous with a HAN and the terms may be used interchangeably.

A "Utility" is a commodity that may be provided to a household, business, or other entity, which may be monitored, or metered, to determine an amount of the utility used or consumed. Utility usage is often measured using a utility meter. Examples of a utility include, but are not limited to, electrical power, water, natural gas, fuel oil, steam, and sewer.

A "Smart Appliance" is a HAN device, typically a white good or other household appliance, which is capable of receiving messages and/or commands over the HAN. In response, the smart appliance may be able to adjust its operational mode (e.g., energy saving mode, turn on/off, etc.) and/or provide information related to utility usage.

A "Smart Utility Meter" is a meter capable of measuring an amount of a utility that is used and proving usage information over a HAN. A smart utility meter may be compliant with one of more standards such as the ZigBee Smart Energy Profile or Z-Wave Advanced Energy Control device class, although compliance with a standard is not necessarily required. A smart utility meter may also connect to a wide area network (WAN) for communicating with the utility provider, in addition to the ability to communicate over the HAN.

A "Standard Utility Meter" is a meter capable of measuring an amount of a utility that is used but is not capable of proving usage information over a HAN. A standard utility meter may have the capability to be monitored remotely by a connection to a WAN, short range RF communication, or other methods.

A "Pulse" emitted by a utility meter, as used herein in the specification and claims, refers to any type of output that may indicate a certain amount of a utility has been transferred. Examples of a pulse include, but are not limited to, an emitted light that may be infrared, visible, or ultraviolet with a limited "on" duration or toggles between on and off, an electrical waveform with at least two states sent on a wire connected to the utility meter where the pulse may be incorporated as a baseband or modulated signal, a reflected light from a rotating high contrast device, a modulated magnetic field, a radio frequency signal that may be modulated using any method to incorporate the pulse indication, an acoustic signal, or any other method. One particular method of sending a pulse is to send a time stamp as a pulse to indicate a time each time that the certain amount of the utility has been transferred.

Different models of standard utility meters may not emit pulses at the same rate per unit of utility usage, even if the meters measure the same utility. For example, some electrical meters emit one pulse for every Watt-hour (Wh) of energy used while others may emit one pulse for every 7.2 kilowatt-hour (kWh) of energy used. A method, computer program product, apparatus and system for detecting the amount of the utility used per pulse is described. A device that consumes the utility is monitored and/or controlled, and the pulse rate from the utility meter is monitored, at two different periods in time where the device is consuming different known amounts of the utility. A pulse rate can be calculated by dividing the known difference in the consumed amounts by the difference in the number of pulses by assuming that other consumers of the utility are constant during the two periods. A method, computer program product and apparatus for emulating a smart utility meter is also described.

Reference now is made in detail to the examples illustrated in the accompanying drawings and discussed below.

FIG. 1A is a block diagram of an embodiment of a system 100 for measuring a utility usage. The system 100 may be used for measuring any type of utility including, but not limited to, electrical power, natural gas and water. A source of the utility, utility connection 88, may connect to a utility meter 80 and be measured by the utility measurement element 84. A metered output 89 may be provided by the utility meter 80 to the infrastructure of a house, business, or other consuming entity. Infrastructure may vary depending on the utility but may include electrical wiring, gas pipes, plumbing for water, or other types of infrastructure capable of distributing the utility.

Figure 1B:
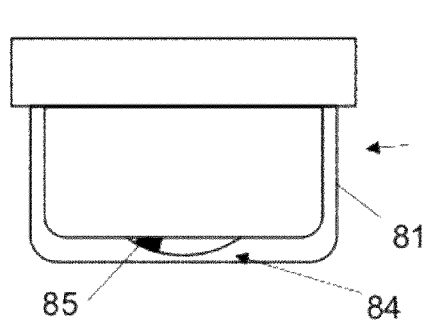
FIGS. 1B and 1C show a top view and front view of a standard utility meter.
Figure 1D:
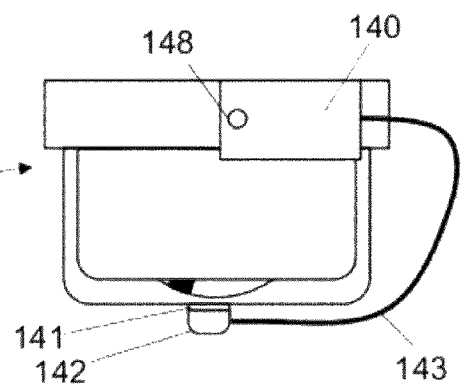
FIGS. 1D and 1E show a top view and front view of an embodiment of a pulse receiver attached to the standard utility meter.
Figure 1C:
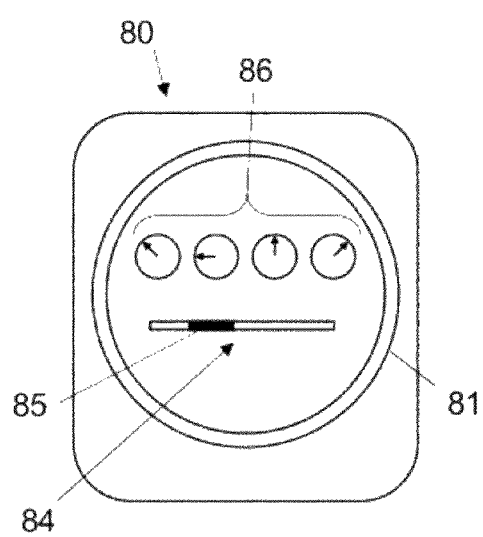

FIGS. 1B and 1C show a top view and front view, respectively, of a standard utility meter 80. The utility meter 80 may have one or more types of display showing the amount of the utility consumed. One type of display is a rotating disc 84 with a dark segment 85. A rotating disc 84 may rotate at a rate that is proportional to the amount of the utility consumed. Another type of display that may be included in the utility meter 80 is one or more dials 86 including a least significant dial 82 with rotating indicator 83. The displays 84, 86 may be visible through a transparent cover 81 that may be made of glass or a clear engineering plastic.

Figure 1E:
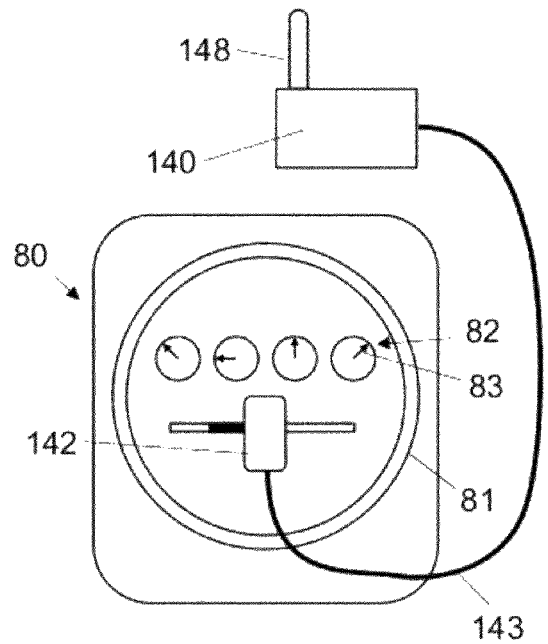

FIGS. 1D and 1E show a top view and front view, respectively, of an embodiment of a pulse receiver 142 attached to the standard utility meter 80. The pulse receiver 142 may be positioned over one of the displays, such as over the rotating disc 84 as shown, using an adhesive 141. In other embodiments the pulse reader 142 may be attached to the utility meter 80 by various other methods, including, but not limited to, glue, bolts, straps, vacuum cups, screws, brackets or any other method capable of positioning the pulse reader 142 in an appropriate position to "read" a display or receive other types of pulses from any other pulse emitter of the utility meter 80.

Referring back to FIG. 1A, the pulse receiver 142 may include a light emitter, such as LED 149, that is positioned over the rotating disc 84 to illuminate a portion of the rotating disc 84. As the rotating disc 84 rotates, one or more high contrast portions, or dark segments 85, of the rotating disc 84 may pass under the LED 149 and vary the amount of light reflected by the rotating disc 84. An optical receiver, such as optical transistor 145, may detect the amount of reflected light. As the rotating disc 84 rotates, a pulse may be generated each time that the dark segment 85 passes under the pulse receiver 142. Pulse receiver circuitry 146 may be able to detect such pulses and employ various techniques to make the pulse distinct, such as amplification, filtering, time averaging, simple level thresholds, hysteresis thresholds, or other techniques well known to one of ordinary skill, although in some embodiments the raw output from the optical transistor 145 may be passed down the connecting cable 143 with little, if any, processing.

In another embodiment, the pulse receiver 142 may be positioned over the least significant dial 82 so that the rotating indicator 83 may pass under the optical transistor 145. The rotating indicator 83 may have a high contrast with respect to the background of the dial 82 so that a pulse may be generated as the indicator 83 varies the amount of light from the LED 149 that is reflected as the indicator 83 passes under the optical transistor 145. The pulse receiver circuitry 146 may employ the same techniques as described above for the rotating disc, variations of the same techniques, or different techniques, to detect the pulses generated by the rotating indicator 83.

Other embodiments may use other techniques to detect pulses created by a moving object such as the rotating disc 84 or rotating indicator 83 including, but not limited to, an image sensor with image recognition, a capacitive sensor, an ultrasonic distance detector, a contact sensor, or any other type of sensor. Other utility meters may utilize a blinking LCD display or other display device that might be detectable by the pulse receiver 142. If the utility meter 80 generates pulses by another method, the pulse sensor 142 may utilize other techniques to receive the pulses. For example a pulse receiver 142 may eliminate or turn off the LED 149 and simply detect optical pulses emitted by some utility meters. Other utility meters may provide for a wired interface to send out pulse waveforms. A pulse receiver 142 for such a utility meter may eliminate or disable both the LED 149 and optical transistor 145 and provide a wired input to the pulse receiver circuitry 146 or even to eliminate the pulse receiver 142 and allow the cable 143 to directly plug into the utility meter. Other embodiments of a pulse receiver may include an RF antenna, receiver and demodulator to detect RF pulses, and yet another embodiment may utilize a microphone to detect audio pulses. Any type of device suitable for receiving the pulses emitted by a particular utility meter may be used as the pulse receiver.

A meter emulator 140 may be connected to the pulse receiver 142 by a cable 143, although in other embodiments, the meter emulator and pulse receiver may be integrated into a single package or the meter emulator and pulse receiver may communicate using wireless RF, optical techniques, or over a computer network including a personal area network (PAN) such as Bluetooth, or a HAN/LAN such as Zigbee, Wi-Fi, or ethernet.

The meter emulator 140 may be based on a microprocessor, microcontroller, central processing unit (CPU) or other processing circuitry shown as processor 103. Other embodiments may utilize customized circuitry such as might be implemented in a field programmable gate array (FPGA) or other custom designed circuitry. The meter emulator 140 may include a network adapter 105 in coupled to the processor 103 using interconnect 106 which may be a point-to-point interface, a bussed interface, or any other type of proprietary or standardized interface. In some embodiments the processor 103 and network adapter 105 may be integrated into a single integrated circuit. The network adapter 105 may connect to an antenna 148 for communicating over a network or HAN 200 that may be wireless, such as Zigbee. The meter emulator 140 may include one or more semiconductor memory devices 107, such as dynamic random access memories (DRAM), synchronous dynamic random access memories (SDRAM), double data rate memories (DDR), flash memories, read only memories (ROM), electrically erasable programmable read only memories (EEPROM) or other memory devices, that are coupled to the processor 103 using interconnect 108 which may be a standard memory interface or some other type of electrical interconnect. In some embodiments, the processor 103 and memory 107 may be integrated on a single integrated circuit. In at least one embodiment, the processor 102, memory 107 and network adapter 105 may be integrated on a single integrated circuit such as the CC2530 from Texas Instruments (TI) which includes a Zigbee network interface.

The meter emulator 140 may include a pulse receiver interface 109 for communicating with the pulse receiver 142. In some embodiments, the pulse receiver interface 109 may be extremely simple and may consist mainly of wiring and passive components to communicate over cable 143, while in other embodiments the pulse receiver interface 109 may include RF demodulators, filtering, digital signal processing, or other sophisticated circuitry to properly interpret the signals sent by the pulse receiver 142. In some embodiments at least a portion of the pulse receiver interface 109 may be included in the processor 103 and/or implemented as software running on the processor 103. In some embodiments, the meter emulator 140 may communicate with the pulse receiver 142 through the network adapter 105 over the HAN.

The meter emulator 140 may include computer program code 104 stored in the memory 107 that can be read and executed by the processor 103 to provide elements of various embodiments. A wide variety of functions may be performed by the computer program code 104, various aspects of which will be discussed later. One aspect of the computer program code 104 may allow the meter emulator 140 to communicate over the HAN 200 with a device 301 including antenna 308. The device 301 may receive the utility from the metered output 89 of the utility meter 80 and may be a consumer of the utility. In at least one embodiment, the meter emulator 140 may control the device 301 to vary the amount of the utility used by the device 301 and may turn the device 301 "on" and/or "off" in some embodiments. In at least one embodiment the device 301 may be able to provide usage information related to its utility usage to the meter emulator 140 or other device such as auxiliary device 210 on the network.

In some embodiments an auxiliary device 210 with antenna 218 for communicating over the HAN 200 may provide certain functionality such as controlling and monitoring the power consumed by device 301 and/or other devices on the HAN 200. The auxiliary device 210 may be given a variety of different names in various embodiments such as a network controller, lighting gateway, power management console, or other names. The auxiliary device 210 may work in concert with one or more of the pulse receiver 142, the meter emulator 140, device 301, information display 800 as well as utility usage controllers (such as power controller 310) and other devices on the network, to provide a full implementation of various embodiments. A usage controller may be able to monitor, measure, report and/or log the usage of the utility by one or more devices. A usage controller may be able to control the usage of the utility by one or more devices. Some embodiments of a usage controller may provide both monitoring and control although other embodiments may provide only monitoring and other may provide only control. In some networked embodiments the auxiliary device 210 implements network management functions. Network management functions can include, among other things, maintaining a list of interconnected devices and maintaining routing tables. In particular, network coordinators are used with Zigbee networks and network controllers are used with Z-Wave networks.

In some embodiments, an information display 800 may be configured to communicate with a smart utility meter over the HAN 200 with antenna 808. The meter emulator 140 may be configured to respond as a smart utility meter allowing the information display 800 to provide information to a user about their use of the utility. The information display 800 may also be a multi-mode display device using a monochrome liquid crystal display (LCD) module 820 with a color overlay. The information display 800 may be back-lit or may use ambient light from the room for visibility. Other embodiments may use different display technology including, but not limited to, thin film transistor (TFT) color LCD, organic light emitting diode (OLED), cathode ray tube (SRT), plasma, or other display technologies. The information display 800 may have several buttons for user control located in the bezel. In the embodiment shown, back button 801 and forward button 802 may be used to control the mode of the information display 800. The Home/OK button 803, the Away/Cancel button 804, the Night/Down button 805 and Up/Settings button 806 may be used for various purposes within the user interface (UI) of the information display 800.

The information display 800 may include various independently addressable display elements, or a fixed set of displayable elements, that may vary between embodiments. Other embodiments may use a matrix addressable pixel-based display. Display elements above the UI buttons 803-806 may be included to allow the current function of the buttons 803-806 to be displayed. The embodiment shown includes a 15 character text line 821. Each character of the text line 821 may be made up of 15 segments that may be used to create a wide variety of symbols, including representations of most letters used in languages using variations of the Latin alphabet, including, but not limited to, English, Danish, German, French, Spanish, Norwegian, Swedish, and others. Other embodiments may use other implementations for text such as a 5×7 dot matrix, a 7, 14, or 16 segment display, or some other type of character display.

The information display 800 also may include other delineated display areas such as the "actual" display area 822 and/or the target/average display area 823. The "actual" display area 822 and target/average display area 823 may include display elements for various currency symbols including, but not limited to US Dollars ($), British Pounds (£), Euros (€) and/or Danish Kroner (Kr). The display areas 822, 823 may also include display elements for showing kW and/or kW-h to allow for energy and/or power readings to be displays as well and some embodiments may include display elements allowing for units of other utilities, such as Therms, BTU, ft$^3$, Gal. liter, or other units. The display areas 822, 823 may also include a multi-character display allowing numbers and/or other characters to be displayed. In the embodiment shown, the "actual" display area 822 and the target/average display area 823 each include 5 characters.

The information display 800 may also include a clock display 824 allowing the current time to be displayed in either 24 hour or 12 hour format and may have current value display 825 with a multi-purpose gauge display that may be used to show the same value at some times and different values at other times. Other icons or symbols may also be included in some embodiments such as an electric vehicle (EV), fan indication, a snowflake, a thermometer, a wireless signal strength meter, a low battery indication and/or a company logo. Other embodiments may include other icons or symbols, and yet other embodiments may not include all the elements shown.

Each individual element of the display may be controlled to be either on or off although in some cases, not every combination of elements may be supported. For example, in some embodiments, the 15 segment display may only support a limited number of characters, such as 828 or 256 different pre-determined characters, instead of the 32768 different possible combinations of the 15 elements. Some embodiments may support a display technology allowing for an intensity level or color to be set instead of having each element being only on or off.

The information display 800 may have a variety of operating modes to allow different types of information to be displayed on a single display. In some embodiments, an electric vehicle charging station may be monitored. In some embodiments the information display 800 may be used as a thermostat. In some embodiments the information display 800 may be able to display a variety of information related to home energy usage including information that may be received by communicating with a smart meter or the smart meter emulator 140. Other embodiments may have modes for displaying other information.

One possible display pattern of the information display 800 related to home gas usage is shown. The information display 800 may show the month-to-date gas usage in the "Actual" display area 822 and the average gas usage per month in the target/average display area 823. The current gas usage as a percentage of the average gas usage may be shown on the gauge 825 and the character display may show "BTU" to indicate that information about natural gas usage is being displayed.

In other embodiments, an auxiliary device 210 on the HAN may communicate with the device 301 and control consumption of the utility by the device 301 and/or communicate with the information display 800. Various embodiments may vary the partitioning of the various parts of different embodiments between the meter emulator 140 and the auxiliary device 210, such as a network controller or lighting gateway.

Figure 2A:
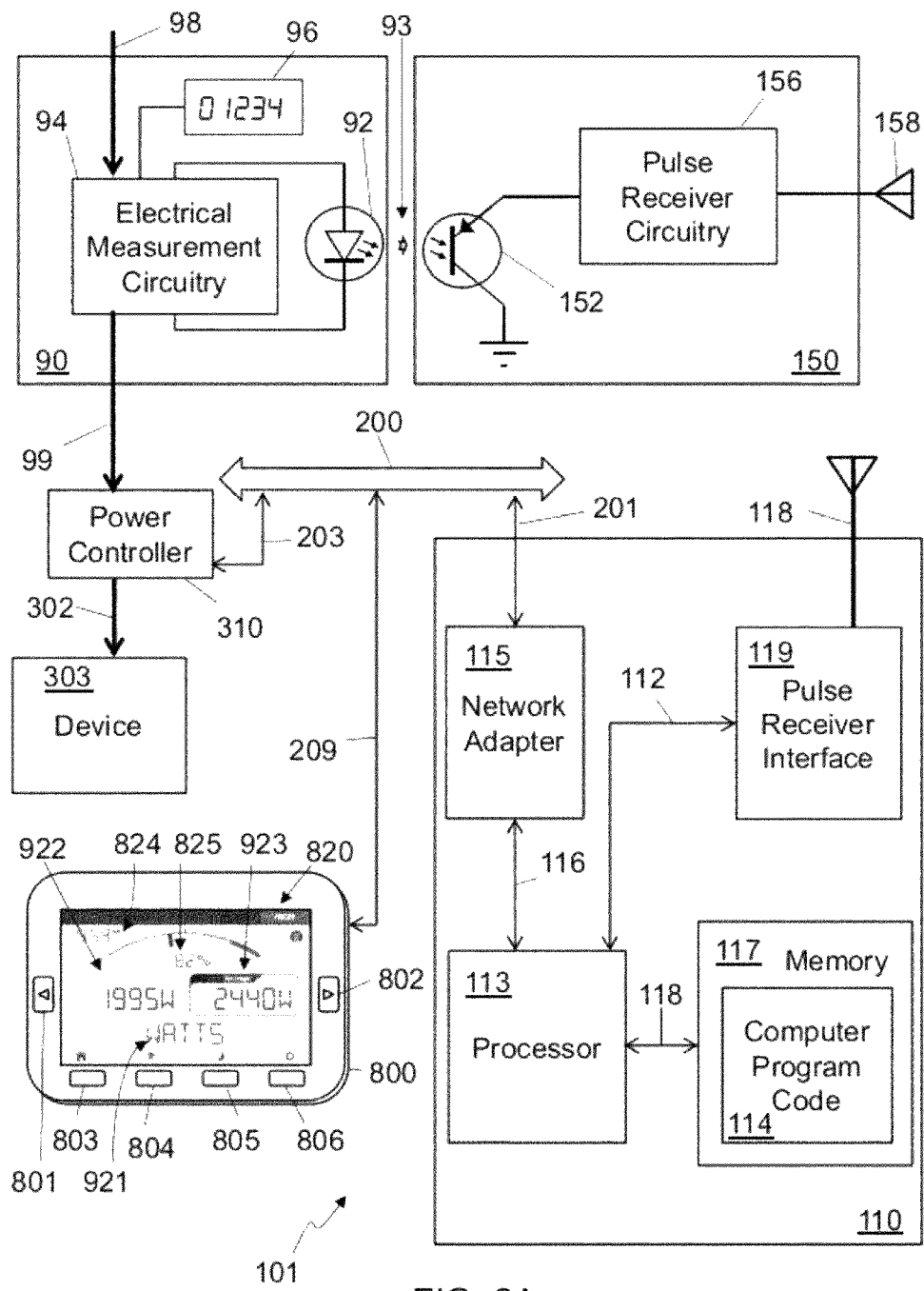
FIG. 2A is a block diagram of an alternative embodiment of a system for measuring a utility usage.

FIG. 2A is a block diagram of an alternative embodiment of a system 101 for measuring a utility usage. The system 101 may be used for measuring any type of utility, but electrical power is shown as an example. A source of electrical power, electrical connection 98, may connect to an electrical utility meter 90 and be measured by the electrical measurement circuitry 94. Metered electrical power 99 may be provided by the electrical utility meter 90 to the electrical wiring infrastructure of a house, business, or other consuming entity.

FIGS. 2B and 2C show a top view and front view, respectively, of a standard electrical utility meter 90. The electrical utility meter 90 may have one or more types of display showing the amount of electrical power consumed. In some embodiments, the electrical utility meter 90 may have a mechanical display similar to the utility meter 80 of FIG. 2B/C. The standard electrical meter 90 shown has an electronic display 96 that may utilize LCD or other display technology to show the current meter reading. The standard electrical meter 90 may include an LED 92 that emits optical pulses dependent on the amount of electrical power measured by the electrical utility meter 90. In some embodiments the electrical utility meter 90 may emit one pulse of light 93 for each Watt-hour (Wh) of electrical power used. Other embodiments may use a different number of Wh per pulse emitted, such as one pulse per 100 Wh, one pulse per 720 Wh, one pulse per 1 kilowatt-hour (kWh), one pulse per 7.2 kWh, one pulse per 12 kWh, or any other rate depending on the electrical utility meter 90. The display 96 and LED 92 may be visible through a transparent cover 91 that may be made of glass or a clear engineering plastic.

FIGS. 2D and 2E show a top view and front view, respectively, of an embodiment of a pulse receiver 150 attached to the standard electrical utility meter 90. The pulse receiver 150 may be positioned over the LED 92 to be able to detect the emitted light 93 from the LED 92. The pulse receiver 150 may be attached to the electrical utility meter 90 using a strap 151. In other embodiments the pulse reader 150 may be attached to the electrical utility meter 90 by various other methods, including, but not limited to, glue, bolts, adhesive pads, vacuum cups, screws, brackets or any other method capable of positioning the pulse reader 150 in an appropriate position to receive the light 93 emitted by the LED 92.

Referring back to FIG. 2A, the pulse receiver 150 may include an optical receiver, such as optical transistor 152, which may detect the light 93 emitted by the LED 92. In some embodiments the light 93 is infrared light but other embodiments use visible light. Care should be taken to properly shield the area around the pulse receiver 150 to avoid interference from ambient light. Pulse receiver circuitry 156 may be able to detect such pulses and employ various techniques to make the pulse distinct such as amplification, filtering, time averaging, simple level thresholds, hysteresis thresholds, or other techniques well known to one of ordinary skill. The pulse receiver circuitry 156 may then send the pulse information to the meter emulator 110 over a wireless link using antenna 158. In other embodiments a cable may be used in place of the wireless link. In some embodiments the network 200 may be used for communication between the pulse receiver 150 and the meter emulator 150, and in other embodiments, the pulse receiver 150 and meter emulator 110 may be integrated into a single package allowing printed circuit traces to be used for the communication.

The meter emulator 110 may be based on a processor 113 and include a network adapter 115 in coupled to the processor 113 using interconnect 116. The network adapter 115 may connect to the network 200 using network connection 201. The meter emulator 110 may include one or more semiconductor memory devices 117 that are coupled to the processor 113 using interconnect 118. The meter emulator 110 may include a pulse receiver interface 119 coupled to the processor 113 using interconnect 112 with antenna 118 for communicating with the pulse receiver 150. Various embodiments may integrate two or more of the processor 113, the network adapter 115, the memory 117 and the pulse receiver interface 119 on a single integrated circuit.

The meter emulator 110 may include computer program code 114 stored in the memory 117 that can be read and executed by the processor 113 to provide elements of various embodiments. A wide variety of functions may be performed by the computer program code 114, various aspects of which will be discussed later. One aspect of the computer program code 114 may allow the meter emulator 110 to communicate with a power controller 310, which has a network connection 203, over the network 200. The meter emulator 110, or auxiliary device 210 on the network 200 may be able to turn the electrical power 302 provided by the power controller 310 "on" and/or "off" and also may be able to query the power controller 310 to determine how much electrical power 302 is being provided. A device 303 may receive electrical power 302 from the power controller 310 and may be a consumer of the electrical power.

In some embodiments, an information display 800 may be configured to communicate with a smart utility meter over the network 200 with network connection 209. The meter emulator 110 may be configured to respond as a smart utility meter allowing the information display 800 to provide information to a user about their use of the utility.

One possible display pattern of the information display 800 related to home electrical usage is shown. The information display 800 may show current power usage in the "Actual" display area 922 and the average power usage over a pre-determined period of time in the target/average display area 923. The current power usage as a percentage of the average power usage may be shown on the gauge 825 and the character display 921 may show "WATTS" to indicate that a current power level is being displayed.

In other embodiments, the auxiliary device 210 on the network 200 may communicate with the power controller 310 and control consumption of the utility by the device 303 and/or communicate with the information display 800. Various embodiments may vary the partitioning of the various parts of different embodiments between the meter emulator 110 and the auxiliary device 210, such as a network controller or lighting gateway.

Figure 3:
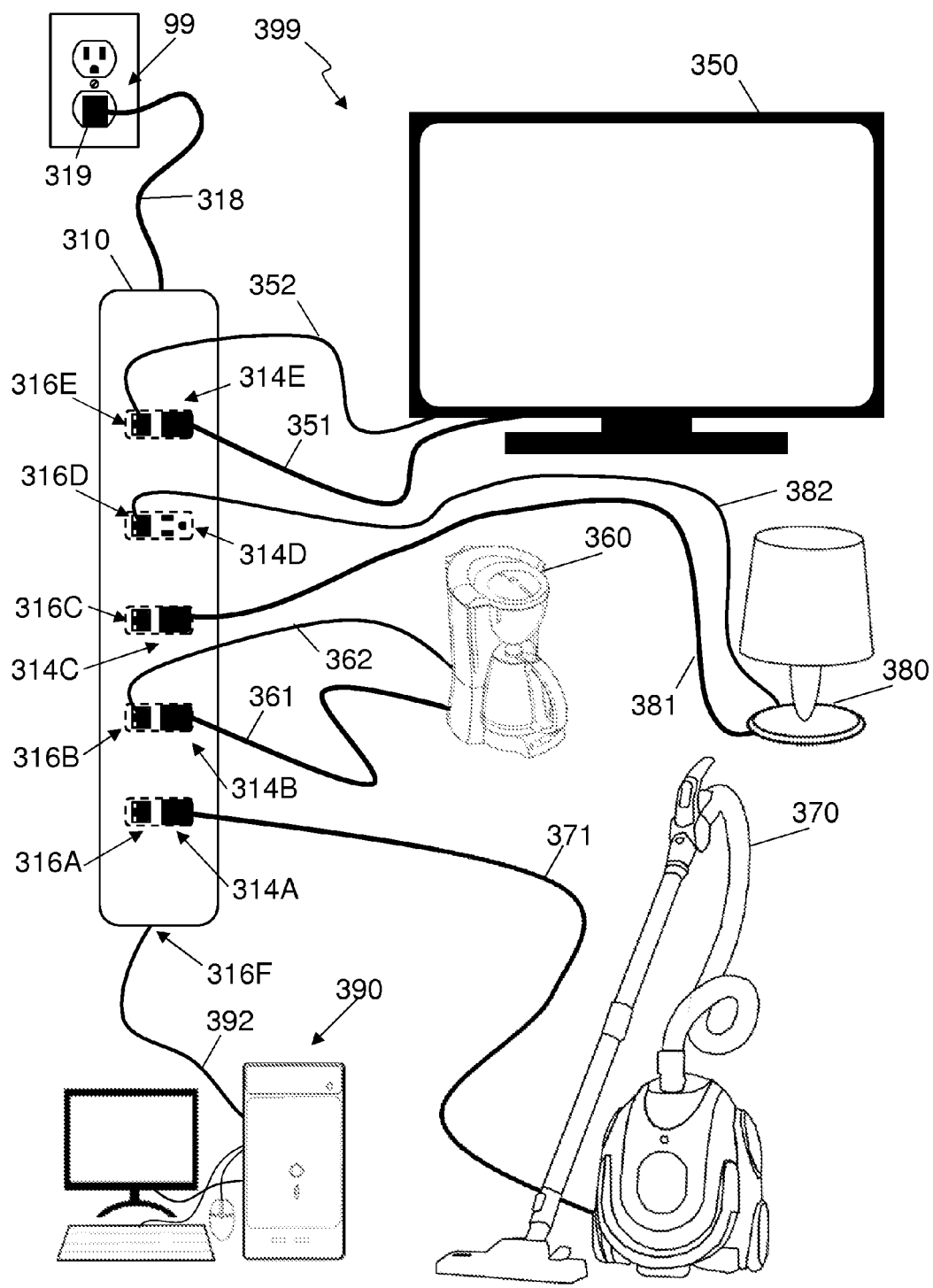
FIG. 3 shows several devices plugged into a power controller.

FIG. 3 shows a system 399 of several devices plugged into a power controller 310. Power controller 310 may have a power cord 318 terminated in power plug 319 that plugs into a standard wall outlet that may be connected to the metered electrical power 99. The AC power of the home may have other devices connected that implement a power line communication (PLC) networking protocol and the power controller 310 may also include a PLC network interface in some embodiments that is a part of network 200. The power controller 310 may have several power sockets 314A-E and some embodiments may include several network connectors 316A-F. In at least one embodiment, the power controller may only have a single power socket and no wired network connectors. The power controller 310 may provide a graphic indication that certain power sockets are associated with certain network connectors, such as boxes made of dashed lines silkscreened onto the power controller 310. In the embodiment of power controller 310 as shown, power outlet 314A is associated with network connector 316A, power outlet 3148 is associated with network connector 3168, power outlet 314C is associated with network connector 316C, power outlet 314D is associated with network connector 316D, and power outlet 314E is associated with network connector 316E. Network connector 316F may not be associated with any power outlet. Other embodiments may have power outlets that are not associated with any network connector.

TV 350 may be drawing electrical power from power outlet 314E through power cord 351 which may have an electrical plug that is plugged into the power socket 314E. The TV 350 may also provide functionality such as, but not limited to, internet TV, digital living network alliance (DLNA) compliant media streaming, remote configuration, or other functions that may use a network. The TV 350 may then have a network cable 352 plugged into network connector 316E to allow the TV 350 to communicate over the network 200.

Networked lamp 380 may allow for control of its on/off state and/or brightness through a network. The networked lamp 380 may have its power cord 381 plugged into socket 314C and be drawing power from socket 314C. The networked lamp 380 may have a network cable 382 plugged into network connector 316D to allow the networked lamp to communicate over the network 200. The network cable 382 and the power cord 381 may be plugged into a network connector 316D and power socket 314C respectively, that are not associated with each other.

Networked coffee pot 360 may provide remote brew initiation, remote status, or other functionality over a network. The networked coffee pot 360 may have its power cord 361 plugged into socket 314B and be drawing power from socket 314B. The networked coffee pot 360 may have a network cable 362 plugged into network connector 3168 allowing the networked coffee pot 360 to communicate over the network 200.

Vacuum cleaner 370 may be a legacy device with no network functionality. The vacuum cleaner 370 may be plugged into power socket 314A. Network connector 316A may not have anything plugged in. Computer system 390 may be plugged into a wall outlet directly and not be drawing power from the power controller 310. But the computer system 390 may have a network cable 392 plugged into network connector 316F to access the network 200.

The PLC network connection in the power controller 310 as well as the network connectors 316A-F may all be a part of the HAN 200. The meter emulator 140, 110 or auxiliary device 210 on the HAN 200 may be able to monitor power consumed through the power controller 310 and may be able to control the on/off state of the power sockets 314A-E. The various devices plugged into the network connectors 316A-F may be able to communicate over the HAN 200 as well and some of those devices, such as the TV 350, coffee pot 360, lamp 380, may be able to report their power consumption over the HAN 200 and/or be controlled through the HAN 200.

Figure 4A:
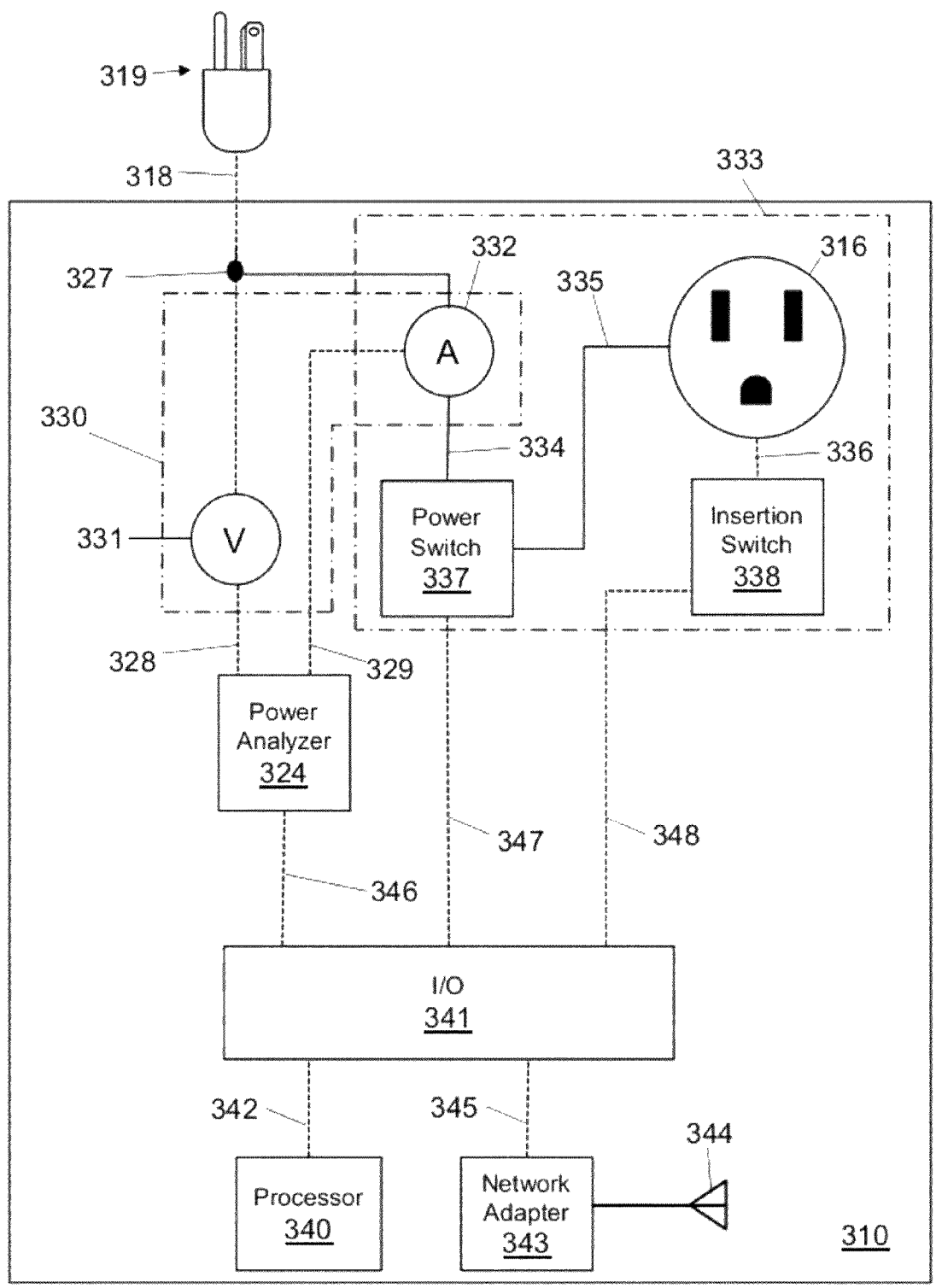
FIG. 4A is a block diagram of a portion of the power controller.

FIG. 4A is a block diagram of a portion of an embodiment of the power controller 310 or a single outlet version of a power controller. This single outlet section shown provides a single power channel 333 including an outlet 316, a power switch 337 and a current sensor 332. The power channel receives electric power via a bus tap 327 from the power cord 318 that receives electrical power through the power plug 319. In other embodiments, multiple power channels provide respective outlets in multi-outlet power nodes.

Power supplied to the outlet 316 is sensed by a power bus voltage sensor 331 and the power channel current sensor 332, together the power sensor block 330. Voltage and current sensor output signal lines 328, 329 are coupled to the power analyzer block 324 which is coupled to the I/O block 341 through signal path 346. In some embodiments, a voltage sensor 331 measures the power node bus 327 voltage. Here, the power supplied to each outlet 316 is known since outlet voltage for all outlets should be the same, and the respective outlet currents are measured by the respective current sensors 332. Further, the power being supplied to the power controller 310 from the power plug 319 is approximately equal to the power drawn by all of the power node outlets and is also known.

In some embodiments, the voltage at each outlet is monitored by a respective voltage sensor located between the outlet 316 and the power switch 337. This embodiment provides for, inter alia, measuring a load's voltage decay after the power switch is opened. In other embodiments, an analog multiplexor consisting of relays, field effect transistors (FETs), or other electro-mechanical or electronic devices, may be interposed between the voltage sensors and each outlet 316 to allow a single voltage sensor to selectively measure the voltage at each outlet 316 individually, independent of the state of the power switches 337

Interposed between the power plug 319 and the outlet 316 is a power switch 337. A power switch signal line 347 couples the I/O block 341 with the power switch 337. The power switch 337 may be any switch known in the art that allows for automated control, such as a mechanical or solid state relay, or a semiconductor switch. In one embodiment a latching type relay is used, and in another embodiment a TRIAC type switch may be used.

The outlet 316 is coupled to a power output of the power switch 337 via the third power circuit 335. In some embodiments, an insertion switch 338 senses 336 whether a plug is inserted in the outlet 316 and provides an insertion signal 348 to the I/O block 341. Plug insertion sensing may be accomplished by any means/device known to persons of ordinary skill in the art. For example, various embodiments employ a capacitive sensor, an optical sensor, and a mechanical sensor. All of these devices are referred to herein as an "insertion switch."

A processor 340, which may have internal memory for storing computer program code and/or data, is in communication with the I/O block 341 over communication lines 342. A network adapter 343, which is connected to the I/O block 341 by communication lines 345, may provide a connection to a wireless network segment of the HAN 200 using antenna 344, although other embodiments may utilize PLC networking and/or wired networking as shown in FIG. 4B.

In various embodiments, a wireless module such as a Z-Wave or Zigbee module is used to implement the I/O block 341, processor block 340, and network adapter 343. For example, a Sigma Designs ZM3102 Z-wave module is used in one embodiment and a Zigbee chipset is used in another embodiment. In some embodiments, the input/output functionality is enhanced with a general purpose I/O expander integrated circuit such as an NXP PCA9534BS 8-bit I2C-bus and SMBus low power I/O port with interrupt.

In an embodiment, a power/energy integrated circuit such as a Cirrus Logic CS 5463 integrated circuit may be used to implement the power analysis functionality of the power analyzer block 324. Power consumption and other data available from the power analysis device includes one or more of real/active power, instantaneous and/or RMS values of current and voltage, apparent power, reactive power, fundamental power, and temperature sensing. As will be understood by persons of ordinary skill in the art, waveform profiles of one or more of voltage, current, and power can be constructed by any processor in signal communication with the I/O block 341. In some embodiments, a measurement system is implemented in the processor 340. The metering system may aggregate power consumption for each outlet 316 to track power consumption for each device 303 plugged into the power controller 310.

Figure 4B:
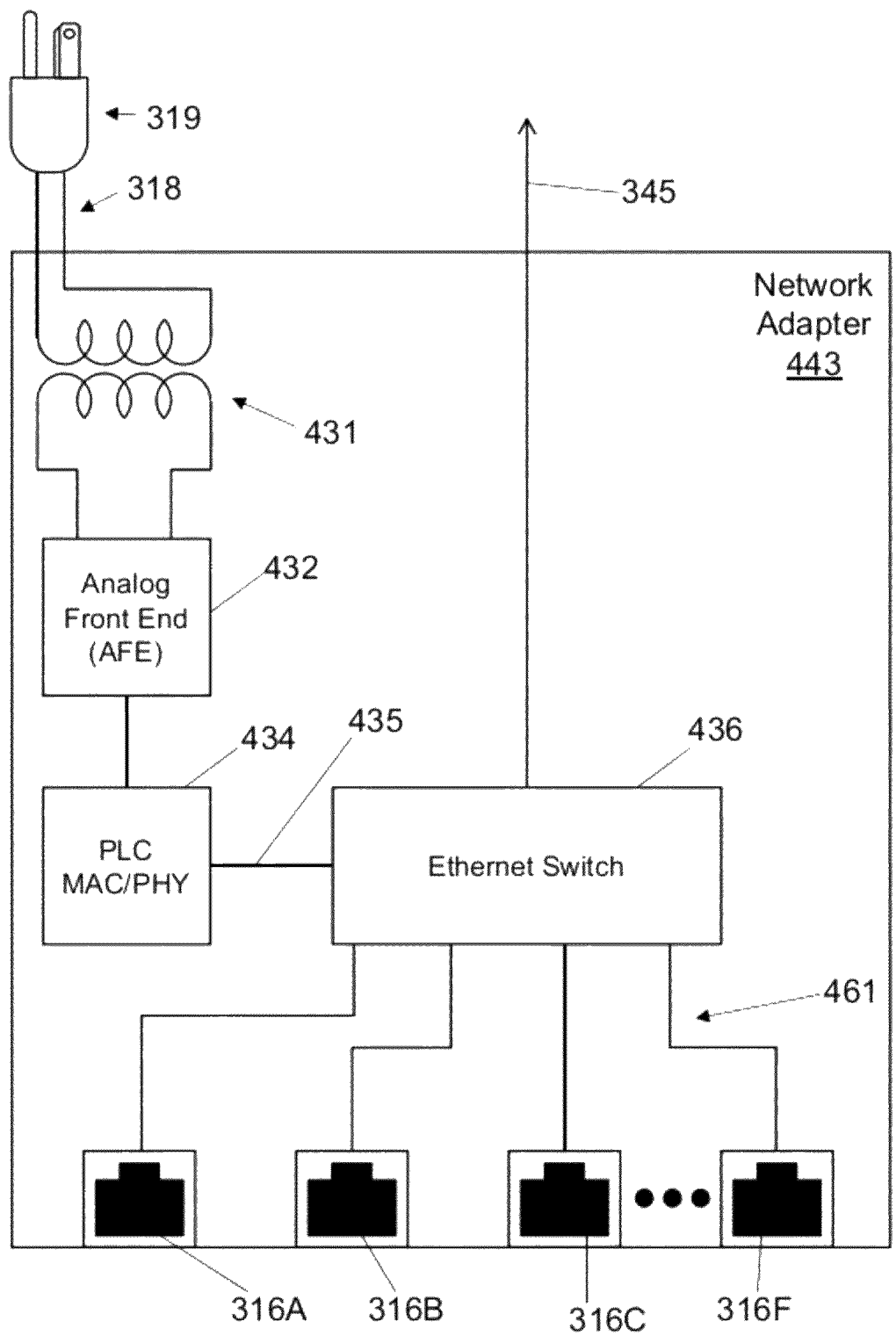
FIG. 4B shows an block diagram of the communications section of a power controller with an ethernet switch.

FIG. 4B shows an block diagram of an alternative embodiment of the network adapter 443 that may be used in a power controller 310 that includes an ethernet switch 436. The embodiment utilizes a power line communications (PLC) network such as HomePlug® for communication. In an embodiment utilizing the network adapter 443, which may replace the network adapter 343 and antenna 344 of FIG. 4A, the processor 340 may have an ethernet connection or an ethernet connection may be included in the I/O block 341 to allow the processor 340 to communicate with the ethernet switch 436.

The power cord 318 receives an electrical signal from the power plug 319, which may be plugged into a socket receiving metered electrical power 99. The power cord 318 may be coupled into the network adapter 443 utilizing a transformer 431. An analog front end (AFE) circuit 432 may be coupled to the transformer 431 to send and/or receive signals coupled on the power cord 318. In one embodiment the AFE may be implemented using an INT1400 integrated circuit from Atheros Communications, Inc. The AFE may be coupled to a PLC media access controller (MAC) and physical layer interface (PHY) block 434. The PLC MAC/PHY 434 may be implemented using an INT6400 integrated circuit from Atheros Communications, Inc. The INT1400 AFE and INT6400 MAC/PHY integrated circuits may be compatible with the HomePlug® AV network protocol specification and may provide up to a 200 Mb/s signaling rate over the power line. The PLC communications may be used for the network 200 or as a part of the network 200. Other embodiments may be compatible with different PLC protocols.

The MAC/PHY 434 may provide a media independent interface (MII) 435 for ethernet protocol communication. The MII 435 may be coupled to an ethernet switch 436 integrated circuit such as the AR8236 6-Port Low-Power Fast Ethernet Switch from Atheros Communications, Inc. allowing communications between the various ethernet ports of the ethernet switch 436. One output of the ethernet switch 436 may be used to communicate to the processor 340 over communication signal line 345, which in the embodiment shown may be a 100-Base-T ethernet connection. The other four 10/100-Base-T ethernet connections 461 may be connected to RJ-45 ethernet connectors 316A-F that may have integrated magnetics components for compliance with ethernet specifications. Various embodiments may have any number of ethernet ports from the ethernet switch 436, with zero, one or more ports used inside the power controller 310, and zero, one, or more ports brought out to ethernet connectors 316A-F, with the ethernet switch 436 bridging between the various ports.

In other embodiments, the ethernet switch 436 may provide functionality for the processor 340 to selectively communicate to a particular ethernet connector 316A-F. By using such functionality, the processor may be able to receive information about the device that is physically plugged into the particular ethernet connector 316A-F. As shown in FIG. 3, a particular ethernet connector 316A-F may be associated with a particular outlet 314A-E. The processor 340 may have these associations pre-programmed so that it can associate information received from a device through a particular ethernet connector 316A-F with a particular outlet 314A-E. For example, as shown in FIG. 3, a networked coffee pot 360 may be plugged into outlet 314B and network connector 316B. The processor 340 may selectively communicate over network connector 316B to the networked coffee pot 360 and determine that the networked coffee pot 360 has a MAC address of 01-23-45-67-89-AB. The processor 340 may then identify that outlet 314B is sending power to the networked coffee pot 360 due to the proximity of the outlet 314B and the network connector 16B, and send the MAC address of the networked coffee pot, 01-23-45-67-89-AB, along with an identifier of outlet 314B, across the PLC network to the meter emulator 110, 140 or to some device that may gather information about the HAN 200 and/or allow a user to control devices on the HAN 200. The meter emulator 110, 140 may use the information received to clearly match information that it may determine about devices on the HAN 200 using simple service discovery protocol (SSDP) or other techniques with the particular outlet that is providing power to those devices. This may allow more accurate assignment of the energy usage and/or costs of a particular device.

Alternative embodiments may include a bridge from the PLC connection to a wireless connection such as 802.11 Wi-Fi, 802.15.4 Zigbee, Z-Wave or other radio frequency networks. In some embodiments, the access point or gateway circuitry for the radio frequency network may connect to one port of the ethernet switch 436 to provide a communications link between the PLC network and the wireless network as well as the other ethernet ports. In other embodiments the access point or gateway circuitry may take the place of the ethernet switch 436 providing for the communication signal line 345 to the I/O block 341 as well as the bridge to the wireless network devices. Bridging may refer to connections between two network segments performed at any level of the Open Systems Interconnection (OSI) Model, including network routing done at OSI Layer 3 (network layer), network bridging performed at OSI Model Layer 2 (data-link layer), network repeating performed at OSI Model Layer 1 (physical layer) or other methods of connecting two network segments and should not be limited to data-link layer bridging, and as such, may include methods that are not compliant with the IEEE 802.1 D bridging standard.

For the purposes of this specification and claims, a network 200 may be a heterogeneous network with some devices communicating using wired ethernet connections, some devices communicating using PLC connections and some devices communicating over a wireless network, or any combination of those types of networks or any other type of network. The heterogeneous network may also be referred to as the bridged network. Communication over the bridged network may allow data to travel across one or more of the bridged network segments but may not require that all data sent over the bridged network travel over every segment of the bridged network.

In some commercial embodiments, a consumer kit for a system may include a pulse receiver, a meter emulator, at least one power controller, and in at least one embodiment, a lighting controller or other device. Any of the devices in the kit may perform aspects of the instant subject matter. During manufacture and testing, these devices may be preconfigured with identification codes allowing interoperation.

Figure 5A:
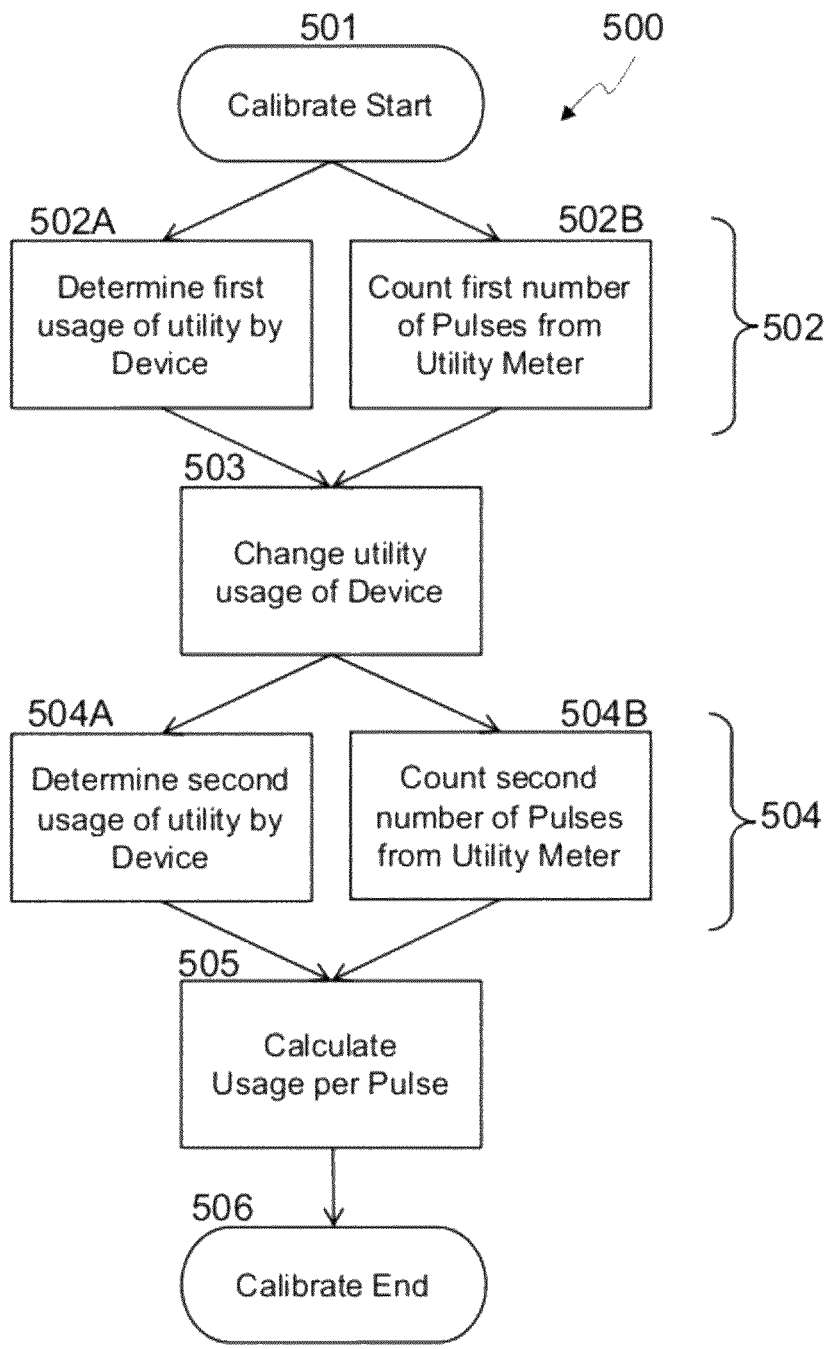
FIG. 5A is a flowchart depicting an embodiment of a method of measuring utility usage.

FIG. 5A is a flowchart 500 depicting an embodiment of a method of measuring utility usage. Because various standard utility meters 80, 90 may provide pulses at different rates for a given utility usage, even if the meters are targeting the same utility, a determination of the pulse rate of the standard utility meter 80, 90 may be useful. A calibration process may start at block 501. The calibration method of flowchart 500 may be initiated by any device including, but not limited to, the pulse receiver 142, 150, the meter emulator 110, 140, the auxiliary device 210, the information display 800 or another computer system such as PC 390 with a connection to the HAN 200.

During a first time period 502, two elements of the method are performed. A first usage of the utility by the device is determined at block 502A and a first number of pulses from the utility meter are counted at block 502B. The first usage of the utility by the device may be determined in several different ways in different embodiments. In some embodiments, the usage is determined by requesting a usage directly from the networked device. Examples of this may be sending a request to the device 303 such as networked TV 350, for its current usage of electrical power. Information may also be included regarding the operating state of the device, such as its on/off state and/or power management parameter or other operating state. The first usage of the utility may also be determined by sending a request to a usage controller, such as power controller 310. The usage controller may be able to provide information regarding the utility usage by the device. In some embodiments, the usage controller may monitor usage of the utility in such a way that the utility usage of the device in question may be consolidated with utility usage of other consumers of the utility. If that is the case, the consolidated utility usage may be used as an estimate of the utility usage of the device or a constant may be subtracted from the consolidated utility usage to arrive at an estimate of the utility usage of the device. In various embodiments an estimate of the utility usage of the device may be determined to be the first usage of the utility.

A first number of pulses from the utility meter are counted at block 502B. The term "counting" as used herein in the specification and claims, may refer to the traditional process of incrementing a number each time a pulse is received but may also refer to timing the duration between pulses or determining a rate that pulses are received. The first number of pulses received corresponds with the first utility usage of the device. The first number of pulses may be counted in the pulse receiver, the meter emulator, the auxiliary device, a PC, or other device.

At block 503 the utility usage by the device consuming the utility changes. Some embodiments may simply wait for the utility usage of the device to change. Other embodiments may control the device to change its usage of the utility. The utility usage of the device may be controlled by communicating with the device or by communicating with the usage controller. In some cases, the device may be turned "On" or "Off," and in other cases the operating state of the device may be changed. Turning the device "Off" may not reduce the utility usage to zero and certain functions of the device may continue to operate even if the device is "Off" as the "Off" state may only be a low utility usage state. If the utility usage is changed by communicating with the usage controller, the device may have its access to the utility completely removed although some embodiments may change a maximum amount of the utility available to the device.

During a second time period 504, two elements of the method are again performed. A second usage of the utility by the device is determined at block 504A and a second number of pulses from the utility meter are counted at block 504B. The second usage of the utility by the device may be determined in much the same way as the first usage was determined although in some embodiments the method used for the second period may be different than that used for the first period. If a consolidated utility usage from the usage controller was used for estimating the first usage of the utility, a similar method should be used to create an estimate for the second usage.

Although it may be possible to use two time periods of different length and compensate for the difference, in most embodiments the first time period and the second time period may be close to the same length of time and occur under conditions that are as close to the same as possible to ensure that the utility usage that is not related to the utility usage by the device being used is as close to the same as possible. One way of keeping the conditions of the first time period and second time period as similar as possible is to have them occur with very little time between them. This may be accomplished by proactively controlling the amount of utility used by the device so that no time is wasted simply waiting for the utility usage to change. Another method that may be used is to repeat the first period and the second period multiple times and use an average of the difference for computing the usage per pulse. Another technique that may be used to improve accuracy is to choose the first and second time periods to occur at a time that very little else is happening for that utility, such as the middle of the night. Another technique is to, after completion of the second time period, put the utility usage of the device back into the same utility usage state for a third time period as it was in the first time period and repeat the first time period elements. They results of the "first" and "third" time periods can be compared, and if they are too different, a new calibration can be performed.

Once the second time period 504 has finished, a usage per pulse may be calculated at block 505 before the calibration method ends at block 506. The usage per pulse may be calculated by taking the difference in the first usage of the utility by the device and the second usage of the utility by the device, which will be a known quantity of the utility, and dividing that by the difference in the first number and second number of pulses. This gives a known quantity of the utility per pulse. As an example, let the baseline usage of the utility for all other users than the device being monitored for a time period be "U", an amount of the utility used by the device in the first time period to be "$D_1$", an amount of the utility used by the device in the second time period to be "$D_2$", the first number of pulses be "$N_1$", and the second number of pulses be "$N_2$". This means that, as long as the first time period and the second time period are equal and the usage of the utility by users other than the device being monitored remains constant, the first usage of the utility is "$U+D_1$" and the second usage of the utility is "$U+D_2$". So a usage per pulse can be calculated as:

$$\text{Usage per Pulse} = \frac{(U + D_1) - (U + D_2)}{N_1 - N_2}$$

The calculated usage per pulse may not be completely accurate due to a variety of factors including differences in the time periods, changes in the amount of the utility used for other purposes between the two time periods, inaccuracies in measurement of the utility used by the device, and rounding effects due to the discrete nature of the amount of the utility signified by each pulse. One or more methods may be employed to reduce the errors in the calculated usage per pulse including, running multiple calibration processes and using statistical methods to determine a best estimate of the usage per pulse, choosing a longer period of time to reduce rounding effects, choosing a shorter period of time to reduce effects due to changing baseline use of the utility and rounding the usage per pulse to one of a fixed set of possible results for a supported set of standard utility meters.

By determining a set of standard utility meters that are officially supported and that encompass a large percentage of the standard utility meters that are likely to be used, a set of possible usage per pulse values may be determined. Then by rounding to the nearest usage per pulse value of the supported set, errors in the calculated usage per pulse values may be reduced or eliminated. For example, a particular set of five standard electric meters may constitute 95% of all standard electric meters deployed in a particular market. In this example, two of the meters may output one pulse for each Wh of electrical power used, two of the meters may output one pulse for each 720 Wh of electrical power used, and one meter may output one pulse for each 12 kWh of electrical power used. In this example an algorithm may be used in which any calculated value of usage per pulse that is within a 25% tolerance of a value used by a meter within the set of five supported meters would be rounded to the closest value in the supported set of values. Any calculated value that is not within 25% of a value used by a supported meter may be retained without rounding to accommodate the 5% of unsupported meters that may exist in the particular market. Other embodiments may use a different tolerance, may use non-symmetric tolerances, may use different tolerances for different values or may simply always round to the nearest supported value, or any other method of rounding a value.

FIG. 5B is a flowchart 510 of an embodiment of emulating a smart utility meter starting at block 511. Information may be received and stored in the meter emulator at block 512. The information may be sent to the meter emulator by a PC under control of a user during installation/configuration, sent to the meter emulator by the auxiliary device, retrieved from a local server on the HAN by the meter emulator, retrieved from a remote server over the internet by the meter emulator or any other method of receiving information at the meter emulator.

In at least one embodiment, the information received may include utility information including, but not limited to, rate information for the utility, information on past usage of the utility by the household or business, rate period information, and/or rate tier information. In some embodiments, the information may include information about a particular smart meter to be emulated, including, but not limited to, usage per pulse information, information on supported registers, information on supported services, and/or other information about the particular smart meter.

Supported services may include such services as logging utility use over time, utility cost over various periods, average utility use by a peer user base, or other services that may be provided by a smart utility meter.

In at least one embodiment the information received may describe a smart meter that is compliant with the "Metering" function set of the Zigbee Smart Energy (SE) Profile as described in the Zigbee Smart Energy Profile 2.0 Technical Requirements Document, ZigBee-105553 DRAFT, published on Apr. 24, 2010 by the ZigBee Alliance, Inc. and HomePlug Powerline Alliance, Inc., or earlier or later versions of the document. In at least on other embodiment, the information received may describe a smart meter that is compliant with Z-Wave Advanced Energy Control (AEC) Device Class.

Pulses may be received from the meter for a period of time, counted, and saved at block 513. Depending on the characteristics of the meter being emulated, the data stored may vary. In some embodiments only a running total of the amount of the utility used is saved. Other embodiments may also store the amount of the utility used for a number of periods of time, e.g. for each of the last 168 hours, each of the last 30 days, or each of the last 12 months, or any combination of those or any number of any other periods of time. Some embodiments may log a time stamp of the time the pulse was received and track a certain number of pulses, e.g. the last one million pulses.

At block 514 a request targeting the smart utility meter being emulated may be received. If no request is received, the meter emulator continues to log pulses at block 513. If a request for the meter being emulated is received, the meter emulator say send the requested data over the network at block 515. The data sent over the network depends on the nature of the request and the capabilities of the smart meter being emulated. The data may simply be the current meter reading or an amount of utility used for this day of last week or any other data that may be available from the meter emulator or the services offered by the meter being emulated.

FIG. 5C is a flowchart 520 of an embodiment of emulating a different meter than the installed meter starting at block 521. The meter emulator may receive pulses from a standard utility meter at block 522 and a received pulse rate may be calculated at block 523. An emulated pulse rate may be calculated at block 524 and information may then be sent over the network at the emulated pulse rate at block 525. The meter emulator may also determine usage per pulse, which may also be called a measured usage per pulse, using the methods described in flowchart 500, by querying the meter directly, or receive information that includes the measured usage per pulse during installation/configuration. The measured usage per pulse is dependent on the specific type of meter installed. An emulated usage per pulse may also be received during installation/configuration or some other time. The emulated usage per pulse may be included in the information received in block 512 of flowchart 510. Depending on the type of meter actually deployed and the type of smart meter being emulated, the measured usage per pulse and the emulated usage per pulse may have the same value or different values.

In some embodiments, the actions described for blocks 522-525 are performed as discrete actions for discrete periods of time, e.g. every 100 seconds. So if there are 1440 pulses received during the first period of time from a meter that sends a pulse for each Wh or electrical power consumed (measured usage per pulse), and an emulated usage per pulse of 720 Wh is desired, two pulses will be sent out during the next 100 seconds.

In another embodiment, the actions described for blocks 522-525 are performed continuously in an integrated fashion. In at least one embodiment, a counter is established that is incremented by an amount equal to the measured usage per pulse each time that a pulse is received. The value of the counter may then be monitored and each time that the counter exceeds the value of the emulated usage per pulse, information is sent out and the counter is decremented by the emulated usage per pulse. A minimum time between pulses sent may also be set to minimize the burstiness of the output, which may be important if the emulated usage per pulse is much smaller than the measured usage per pulse. This technique ensures that, over time, a number of pulses are sent out, based on an emulated usage per pulse, which exactly represents the amount of the utility represented by the received pulses, based on the measured usage per pulse.

The information sent out at the emulated pulse rate may take many forms. In some embodiments, the information is a packet with a time stamp sent over a network. In some embodiments, the information may be a total amount of utility used or an incremental amount of utility used. In some embodiments, the information may be a fixed value representing a pulse. Various embodiments may use various combinations of these or other representations, and the information may be sent as a broadcast message, a multi-cast message, a message addressed to a specific device, or any other type of network message.

In many embodiments, the methods described in the flow charts 500, 510, 520 may be implemented using computer code running on a processor as described above, but in some embodiments, parts of one or more block, all one or more block, or all of the blocks of the methods shown may be implemented using other circuits or other computers that are in the pulse receiver, meter emulator, power controller, device 301, auxiliary device 210, or PC 390, that are in communication over the HAN 200 or other communication means. In some embodiments, the methods may be embodied as a computer program product with computer code stored on a non-transitory computer readable medium.

Figure 6:
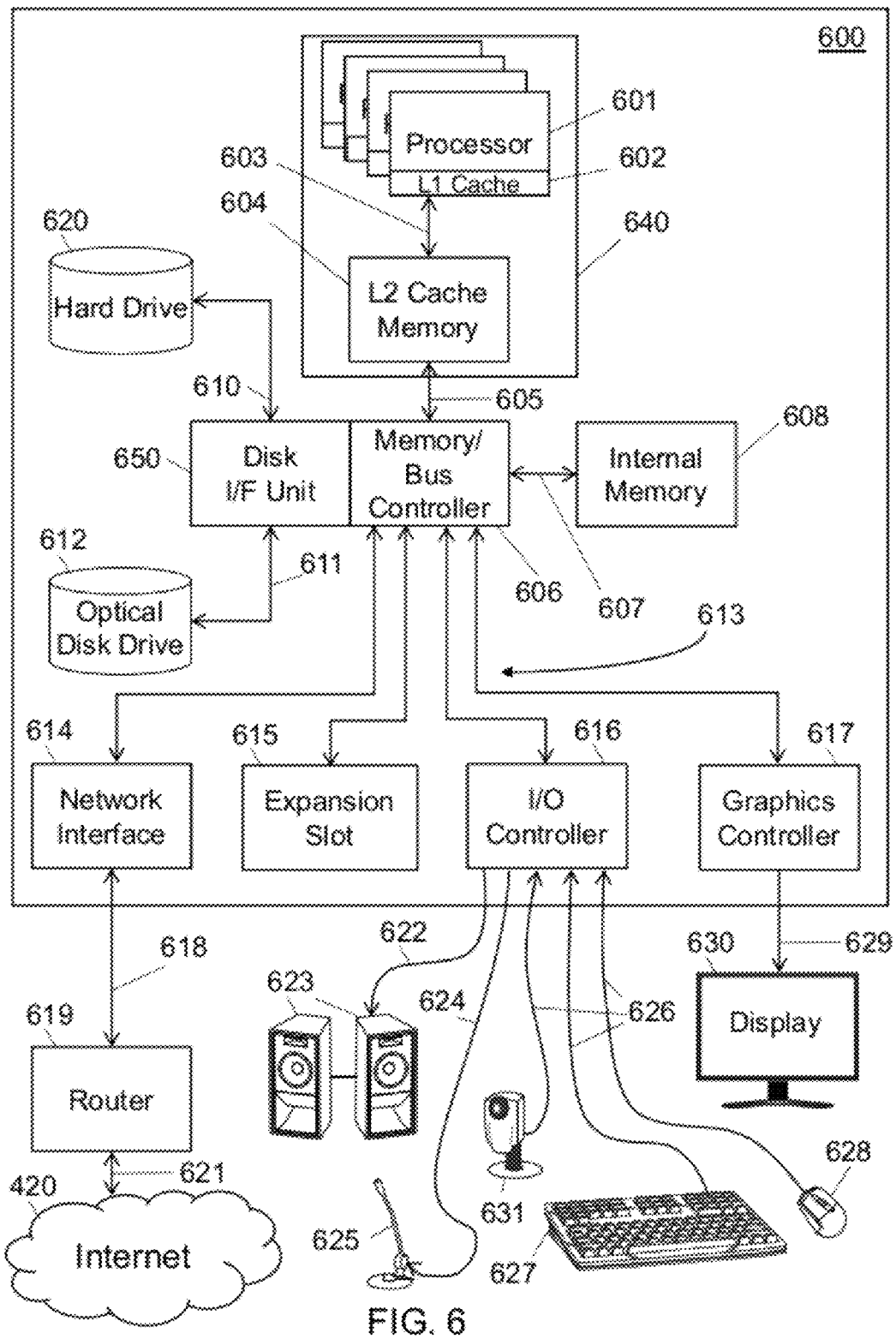
FIG. 6 is a computer system suitable for use in various embodiments.

FIG. 6 depicts details of a computer system 600 suitable for various embodiments of the auxiliary device 210, meter emulator 110, 140, PC 390 or other PC, local server, remote server, or other computer useful in various embodiments. The computer system 600 may be located in proximity to the system 100, 101 and in direct communication with the HAN 200, or may be located remotely and communicate with the devices on the HAN 200 over the internet 420. The computer system 600 may store computer program code for executing the methods shown on flowcharts 500, 510, 520. In some embodiments, a computer system 600 may store computer program code on its computer readable storage medium that is designed to be executed on a processor that is different than the processor 601, such as in the example of a firmware update service running on a computer system 600 accessible over the internet 420 by the various devices on the HAN 200.

The computer system 600 may be configured in the form of a desktop computer, a laptop computer, a mainframe computer, or any other hardware or logic arrangement capable of being programmed or configured to carry out instructions. In some embodiments the computer system 600 may act as a server, accepting inputs from a remote user over a local area network (LAN) 618 or the internet 420. In other embodiments, the computer system 600 may function as a smart user interface device for a server on a LAN 618 or over the internet 420. The computer system 600 may be located and interconnected in one location, or may be distributed in various locations and interconnected via communication links such as a LAN 618 or a wide area network (WAN), via the Internet 420, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 600, but only one typical architecture is depicted in FIG. 6.

Computer system 600 may include a processor 601 which may be embodied as a microprocessor, two or more parallel processors, a central processing unit (CPU) or other such control logic or circuitry. The processor 601 may be configured to access a local cache memory 602, and send requests for data that are not found in the local cache memory 602 across a cache bus 603 to a second level cache memory 604. Some embodiments may integrate the processor 601, and the local cache 602 onto a single integrated circuit and other embodiments may utilize a single level cache memory or no cache memory at all. Other embodiments may integrate multiple processors 601 onto a single die and/or into a single package. Yet other embodiments may integrate multiple processors 601 with multiple local cache memories 602 with a second level cache memory 604 into a single package 640 with a front side bus 605 to communicate to a memory/bus controller 606. The memory/bus controller 606 may accept accesses from the processor(s) 601 and direct them to either the internal memory 608 over memory bus 607 or to the various input/output (I/O) busses 610, 611, 613. A disk interface unit 650 may connect to the communication link 610 to the hard disk drive 620 and/or or other communication link 611 to the optical disks 612 and may be integrated into the memory/bus controller 606 or may be a separate chip. Some embodiments of the computer system 600 may include multiple processor packages 640 sharing the front-side bus 605 to the memory/bus controller. Other embodiments may have multiple processor packages 640 with independent front-side bus connections to the memory/bus controller 606. The memory bus controller 606 may communicate with the internal memory 608 using a memory bus 607. The internal memory 608 may include one or more of random access memory (RAM) devices such as synchronous dynamic random access memories (SDRAM), double data rate (DDR) memories, or other volatile random access memories. The internal memory 608 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. The various memory devices may be embodiments of a non-transitory computer readable storage medium suitable for storing computer program code and/or data. In some embodiments, the computer system 600 may also include 3rd level cache memory or a combination of these or other like types of circuitry configured to store information in a retrievable format. In some implementations the internal memory 608 may be configured as part of the processor 601, or alternatively, may be configured separate from it but within the same package 640. The processor 601 may be able to access internal memory 608 via a different bus or control lines than is used to access the other components of computer system 600.

The computer system 600 may also include, or have access to, one or more hard disk drives 620 (or other types of storage memory) and optical disk drives 612. Hard disk drives 620 and the optical disks for optical disk drives 612 are examples of non-transitory machine readable (also called computer readable) mediums suitable for storing computer program code and/or data. The optical disk drives 612 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 600 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 600 may either include the hard disk drives 620 and optical disk drives 612 as an integral part of the computer system 600 (e.g., within the same cabinet or enclosure and/or using the same power supply), as connected peripherals, or may access the hard disk drives 620 and optical disk drives 612 over a network, or a combination of these. The hard disk drive 620 often includes a rotating magnetic medium configured for the storage and retrieval of data, computer programs or other information. The hard disk drive 620 also often includes a disk controller capable of controlling the motor to rotate the storage medium as well as access the data on the medium. In some embodiments, an additional drive may be a solid state drive using semiconductor memories. In other embodiments, some other type of computer useable medium may be used. The hard disk drive 620 need not necessarily be contained within the computer system 600. For example, in some embodiments the hard disk drive 620 may be server storage space within a network that is accessible to the computer system 600 for the storage and retrieval of data, computer programs or other information. In some instances the computer system 600 may use storage space at a server storage farm, or like type of storage facility, that is accessible by the Internet 420 or other communications lines. The hard disk drive 620 is often used to store the software, instructions and programs executed by the computer system 600, including for example, all or parts of the computer application program for carrying out activities of the various embodiments.

The disk interface 610 and/or communication link 611 may be used to access the contents of the hard disk drives 620 and optical disk drives 612. These interfaces/links 610, 611 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium.

The memory/bus controller may also provide other I/O communication links 613. In some embodiments, the links 613 may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 613 may be a point-to-point link such as PCI-Express, Hyper-Transport, or any other point-to-point I/O link. Various I/O devices may be configured as a part of the computer system 600. In many embodiments, a network interface 614 may be included to allow the computer system 600 to connect to a network 618. The network 618 may be an IEEE 802.3 ethernet network, an IEEE 802.11 Wi-Fi wireless network, or any other type of computer network including, but not limited to, LANs, WAN, HAN, personal area networks (PAN), wired networks, radio frequency networks, powerline networks, and optical networks. A router 619 or network gateway, which may be a separate component from the computer system 600 or may be included as an integral part of the computer system 600, may be connected to the network 618 to allow the computer system 600 to communicate with the internet 420 over an internet connection 621 such as an asymmetric digital subscriber line (ADSL), data over cable service interface specification (DOCSIS) link, T1 or other internet connection mechanism. In other embodiments, the computer system 600 may have a direct connection to the internet 420. In some embodiments, an expansion slot 615 may be included to allow a user to add additional functionality to the computer system 600.

The computer system 600 may include an I/O controller 616 providing access to external communication interfaces such as universal serial bus (USB) connections 626, serial ports such as RS-232, parallel ports, audio in 624 and audio out 622 connections, the high performance serial bus IEEE-1394 and/or other communication links. These connections may also have separate circuitry in some embodiments, or may be connected through a bridge to another computer communication link provided by the I/O controller 616. A graphics controller 617 may also be provided to allow applications running on the processor 601 to display information to a user. The graphics controller 617 may output video through a video port 629 that may utilize a standard or proprietary format such as an analog video graphic array (VGA) connection, a digital video interface (DVI), a digital high definition multimedia interface (HDMI) connection, or any other video interface. The video connection 629 may connect to display 630 to present the video information to the user. The display 630 may be any of several types of displays, including a liquid crystal display (LCD), a cathode ray tube (CRT) monitor, on organic light emitting diode (OLED) array, or other type of display suitable for displaying information for the user. The display 630 may include one or more light emitting diode (LED) indicator lights, or other such display devices. Typically, the computer system 600 includes one or more user input/output (I/O) devices such as a keyboard 627, mouse 628, and/or other means of controlling the cursor represented including, but not limited to, a touchscreen, touchpad, joystick, trackball, tablet, or other device. The user I/O devices may connect to the computer system 600 using USB 626 interfaces or other connections such as RS-232, PS/2 connector or other interfaces. Some embodiments may include a webcam 631 which may connect using USB 626, a microphone 625 connected to an audio input connection 624 and/or speakers 623 connected to an audio output connection 622. The keyboard 627 and mouse 628, speakers 623, microphone 625, webcam 631, and monitor 630 may be used in various combinations, or separately, as means for presenting information to the user and/or receiving information and other inputs from a user to be used in carrying out various programs and calculations. Speech recognition software may be used in conjunction with the microphone 625 to receive and interpret user speech commands.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "lighting gateway," "logic" or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A method of measuring utility usage, the method comprising:
    receiving pulses from a utility meter, wherein the pulses are emitted dependent on usage of a utility measured by the utility meter;
    counting a first number of the pulses emitted during a first period of time;
    determining a first usage of the utility by a device during the first period of time by communicating with the device;
    counting a second number of the pulses emitted during a second period of time;
    determining a second usage of the utility by the device during the second period of time by communicating with the device; and
    calculating a usage per pulse based on a difference in the first usage and the second usage, and a difference in the first number of the pulses and the second number of the pulses;
    wherein the device is in a different state during the first period of time than during the second period of time.

2. The method of claim 1, wherein the communicating with the device comprises:
    controlling the device to change said state of the device.

3. The method of claim 2, wherein the controlling of the device comprises sending a command to turn off the device.

4. The method of claim 1, wherein the communicating with the device comprises:
    receiving the first usage and the second usage from the device.

5. The method of claim 1, further comprising:
    rounding the calculated usage per pulse to one of a set of supported values.

6. The method of claim 1, further comprising:
    controlling a usage controller, wherein the usage controller is configured to control an availability of the utility to the device.

7. The method of claim 1, wherein the utility is electrical power.

8. The method of claim 1, wherein the pulses comprise light.

9. The method of claim 1, further comprising:
    counting a third number of the pulses emitted during a third period of time;
    calculating a metered usage of the utility during the third period of time based on the third number of the pulses and the usage per pulse; and
    sending information based on the metered usage over a network.

10. The method of claim 9, further comprising:
    determining an emulated usage per pulse; and
    calculating an emulated pulse rate based on the metered usage and the emulated usage per pulse;
    wherein the sent information is emulated pulse information based on the emulated pulse rate.

11. The method of claim 1, further comprising:
    receiving data from a remote server;
    storing the received data; and
    responding to a request configured to communicate with a networked utility meter by providing a response over a network based on the received data.

12. The method of claim 11, further comprising:
counting a third number of the pulses emitted during a third period of time; and
calculating a metered usage of the utility during the third period of time based on the third number of the pulses and the usage per pulse;
wherein the received data comprises pricing of the utility, and the response represents a cost of the utility used that is based on the metered usage and the pricing of the utility.

13. A computer program product for measuring utility usage, the computer program product comprising:
a non-transitory computer readable storage medium having computer readable program code embodied therewith, the computer readable program code comprising:
computer readable program code configured to receive information about pulses emitted from a utility meter, wherein the pulses are emitted dependent on usage of a utility measured by the utility meter;
computer readable program code configured to communicate with a device to determine a first usage of the utility by the device in a first state during a first period of time;
computer readable program code configured to communicate with the device to determine a second usage of the utility by the device in a second state during a second period of time; and
computer readable program code configured to calculate a usage per pulse based on a difference in the first usage and the second usage, and a difference in a first number of the pulses that are received during the first period of time and a second number of the pulses that are received during the second period of time.

14. The computer program product of claim 13, further comprising:
computer readable program code configured to control the device, through the communication with the device, to change said state of the device.

15. The computer program product of claim 14, wherein the controlling of the device comprises sending a command to turn off the device.

16. The computer program product of claim 13, further comprising:
computer readable program code configured to receive the first usage and the second usage from the device through the communication with the device.

17. The computer program product of claim 13, further comprising:
computer readable program code configured to round the calculated usage per pulse to one of a set of supported values.

18. The computer program product of claim 13, further comprising:
computer readable program code configured to control a usage controller, wherein the usage controller is configured to control an availability of the utility to the device.

19. The computer program product of claim 13, further comprising:
computer readable program code configured to count a third number of the pulses emitted during a third period of time;
computer readable program code configured to calculate a metered usage of the utility during the third period of time based on the third number of the pulses and the usage per pulse; and
computer readable program code configured to send information based on the metered usage over a network.

20. The computer program product of claim 13, further comprising:
computer readable program code configured to determine an emulated usage per pulse; and
computer readable program code configured to calculate an emulated pulse rate based on the metered usage and the emulated usage per pulse;
wherein the sent information is emulated pulse information based on the emulated pulse rate.

21. The computer program product of claim 13, further comprising:
computer readable program code configured to receive data from a remote server;
computer readable program code configured to store the received data; and
computer readable program code configured to respond to a request configured to communicate with a networked utility meter by providing a response over a network based on the received data.

22. The computer program product of claim 21, further comprising:
computer readable program code configured to count a third number of the pulses emitted during a third period of time; and
computer readable program code configured to calculate a metered usage of the utility during the third period of time based on the third number of the pulses and the usage per pulse;
wherein the received data comprises pricing of the utility, and the response represents a cost of the utility used that is based on the metered usage and the pricing of the utility.

23. An apparatus for measuring utility usage, the apparatus comprising:
the computer program product of claim 13;
a network interface; and
a processor communicatively coupled with the computer readable storage medium, and the network interface, wherein the processor is capable of executing the computer readable program code.

24. The apparatus of claim 23, further comprising:
a pulse receiver configured to have at least a portion of the pulse receiver mechanically attached to the utility meter and receive the pulses from the utility meter;
wherein the utility is electrical power;
the pulses comprise light; and
the pulse receiver is configured to communicate with the processor using radio frequency communication.

25. A system for measuring utility usage, the system comprising:
a pulse receiver configured to receive pulses from a utility meter, wherein the pulses are emitted dependent on usage of a utility measured by the utility meter;
means for determining a usage of the utility by a device;
circuitry configured to communicate with the pulse receiver and the means for determining the usage of the utility by the device, and to calculate a usage of the utility per pulse based on a difference in a first usage of the utility by the device in a first state during a first period of time and a second usage of the utility by the device in a second state during a second period of time, and a difference in a first number of the pulses that are received during the first period of time and a second number of the pulses that are received during the second period of time.

26. The system of claim 25, further comprising:
means for controlling the device to create a difference between the first usage and the second usage of the utility by the device.

27. The system of claim 25, further comprising:
at least one usage controller, wherein the at least one usage controller is configured to receive commands from the circuitry and control an availability of the utility to the device.

28. The system of claim 27, wherein the circuitry and the at least one usage controller communicate over a home area network.

29. The system of claim 25, wherein:
the utility is electrical power;
the pulses comprise light; and
at least a portion of the pulse receiver is configured to be mechanically attached to the utility meter.

30. The system of claim 29, wherein:
the circuitry and the pulse receiver communicate using radio frequency communication.

31. The system of claim 25, wherein the circuitry is further configured to:
calculate a metered usage of the utility during a third period of time based on a third number of the pulses emitted during the third period of time and the usage per pulse; and
send information based on the metered usage over a network.

32. The system of claim 31, wherein the circuitry is further configured to:
determine an emulated usage per pulse; and
calculate an emulated pulse rate based on the metered usage and the emulated usage per pulse;
wherein the sent information is emulated pulse information based on the emulated pulse rate.

33. The system of claim 31, further comprising:
an information display configured to communicate over the network;
wherein the information display is configured to receive and display the information based on the metered usage sent over the network.

34. The system of claim 25, further comprising:
a network interface in communication with the circuitry and configured to communicate over a network; and
at least one storage element communicatively coupled to the circuitry;
wherein the circuitry is further configured to:
receive data from a remote server over the network;
store the received data in the at least one storage element; and
respond to a request configured to communicate with a networked utility meter by providing a response over the network based on the received data.

35. The system of claim 34, wherein the circuitry is further configured to calculate a metered usage of the utility during a third period of time based on a third number of the pulses emitted during the third period of time and the usage per pulse;
wherein the received data comprises pricing of the utility, and the response represents a cost of the utility used that is based on the metered usage and the pricing of the utility.

* * * * *